United States Patent [19]
Olsen et al.

[11] Patent Number: 4,756,220
[45] Date of Patent: * Jul. 12, 1988

[54] SAFETY MECHANISM FOR SAWS

[75] Inventors: Joseph C. Olsen, Sunnyvale; Richard H. Steinbach, Santa Clara, both of Calif.

[73] Assignee: Engineering Consulting Services, San Jose, Calif.

[*] Notice: The portion of the term of this patent subsequent to Jan. 20, 2004 has been disclaimed.

[21] Appl. No.: 1,703

[22] Filed: Jan. 9, 1987

Related U.S. Application Data

[63] Continuation-in-part of Ser. No. 811,016, Dec. 18, 1985, Pat. No. 4,637,288.

[51] Int. Cl.[4] .................. B27G 19/02; B27B 5/38
[52] U.S. Cl. .......................... 83/375; 83/453; 83/490; 83/381; 83/DIG. 1; 30/388
[58] Field of Search ............ 83/DIG. 1, 490, 453, 83/399, 374, 375, 581; 30/388

[56] References Cited

U.S. PATENT DOCUMENTS

| | | | |
|---|---|---|---|
| 3,711,946 | 1/1973 | Troutman | 30/388 |
| 3,886,658 | 6/1975 | Wikoff | 30/388 |
| 3,994,192 | 11/1976 | Faig | 83/490 |
| 4,074,602 | 2/1978 | Brower | 83/DIG. 1 |
| 4,283,977 | 8/1981 | Batson | 83/453 |
| 4,528,488 | 7/1985 | Susemihl | 83/DIG. 1 |
| 4,637,288 | 1/1987 | Olsen et al. | 83/375 |

Primary Examiner—Donald R. Schran
Attorney, Agent, or Firm—Fliesler, Dubb, Meyer & Lovejoy

[57] ABSTRACT

An improvement is set forth in a sawing apparatus having a table supporting a workpiece, a fence for guiding the workpiece and an operator moveable electrically operated saw having a first normally biased off switch controlling application of electric power to the apparatus, the switch being positioned to be controlled by the hand of an operator which controls movement of the saw. The improvement comprises a second normally biased off switch connected in series with the first normally biased off switch, the second switch being mounted adjacent to the fence a sufficient distance from the saw blade to prevent the saw blade from contacting the operator's off hand when the off hand is activating the second switch and in a position whereat the off hand can, simultaneously with activating the second switch, adjust the position of the workpiece along the fence. Since in order for the saw blade to rotate both hands of an operator must be holding onto normally off switches and since both switches are in positions removed from the area of movement of the saw blade, the operator is protected from accidently cutting himself. Yet, the apparatus allows the operator adequate control of the workpiece being cut and further allows a radial arm saw to function as a ripping saw without interference.

6 Claims, 7 Drawing Sheets

SAFETY MECHANISM FOR SAWS

CROSS-REFERENCE

This application is a continuation-in-part of copending application Ser. No. 811,016, filed Dec. 18, 1985, now U.S. Pat. No. 4,637,288.

TECHNICAL FIELD

This invention relates to an improvement in a sawing apparatus such as a powered rotary miter saw or a radial arm saw. More particularly the invention relates to an improved safety feature to prevent the user of such an apparatus from accidentally injuring his off-hand (hand not presently encumbered or necessary to actuate the sawing apparatus) or the fingers of the off-hand by moving them into the area of the saw blade when the saw blade is moving.

BACKGROUND ART

A number of devices are known for clamping workpieces which are fed into a machine.

U.S. Pat. No. 3,073,589, issued Jan. 15, 1963 to G. Hohwart discloses a work clamping fixture which is commonly used to hold a workpiece during a machining operation. The workpiece is clamped between a stationary and a movable jaw. The movable jaw is carried by and reciprocally actuated to and from the clamping position by slidably mounted posts through a rack and pinion which also acts to operate double cone locks when the work is clamped to hold the work securely by friction.

U.S. Pat. No. 2,667,903, issued Feb. 2, 1954 to R. A. McCallum describes a sawing machine with a sequentially operated holder-guard and saw. The McCallum saw is used primarily to cut mine timbers to the proper size. The saw guard also serves as a work holder, and a single fluid actuated motor performs the sequential operations of moving the saw guard into position to hold timber, and then advancing the saw against the timber for the cut. A reverse set of sequential operations takes place after the cut is completed.

U.S. Pat. No. 3,939,746, issued Feb. 24, 1976 to G. W. Rogers, et al. discloses a saw guard for a circular saw having a workpiece holder that moves relative to the saw blade. The saw guard is mounted on the leading edge of the workpiece holder, and is moved into a shielding position adjacent the cutting edge of the blade while the work piece holder is being restocked.

U.S. Pat. No. 4,206,672, issued June 10, 1980 to W. A. Smith describes yet another type of work holder in combination with a saw guard. The combination guard and work holder comprise two parallel plates pivotally attached to a jig and operable to swing downward on opposite sides of a through-slot to clamp the workpiece and to enclose the saw blade as the workpiece is advanced into the blade.

U.S. Pat. No. 1,600,604, issued Sept. 21, 1926 to A. Sorlien discloses a board holder for sawing machines. The board holder is attachable to the saw guide and is adjustable towards or away from the saw so that it may be disposed over any desired part of the board. A serrated eccentric mounted in a sleeve holds the board in place and prevents the board from being kicked back out by the rotating saw blade.

None of the aforementioned patents actively prevents the user of a saw from advancing his off-hand in the vicinity of the blade when the blade is operating. Therefore, numerous accidents occur wherein the operator of such a blade structure loses one or more of his fingers or other parts of his off-hand due to just such an accident.

DISCLOSURE OF THE INVENTION

The present invention is directed to overcoming one or more of the problems as set forth above.

In accordance with an embodiment of the present invention an improvement is set forth in a sawing apparatus having a table supporting a workpiece, a fence for guiding the workpiece and an operator moveable electrically powered saw having a first normally biased off switch controlling application of electrical power to the apparatus, the switch being positioned to be controlled by the hand of an operator which controls movement of the saw. The improvement is in the nature of a second normally biased off switch connected in series with the first switch. The second switch is mounted adjacent the fence a sufficient distance from the saw to prevent the saw from contacting the off hand of the operator when the off hand is activating the second switch and in position whereat the off hand of the operator can, simultaneously with activating the second switch, adjust the position of the workpiece along the fence.

In accordance with another embodiment of the present invention, an improvement is set forth in a sawing apparatus having a table for supporting a workpiece, a fence for guiding the workpiece and an operator moveable electrically powered saw having a first normally biased off switch controlling application of electrical power to the apparatus, the switch being positioned to be controlled by the hand of an operator which controls movement of the saw. The improvement is in the nature of a pair of normally biased off switches connected in parallel to one another and in series with the first normally biased off switch. The switches of said pair being mounted adjacent to the fence, one to the left of said saw and the other to the right of said saw, the switches of said pair being located a sufficient distance from the saw to prevent the saw from contacting the off hand of the operator when the off hand is activating either of said switches of said pair, the second switches being positioned to be controlled by the off hand of the operator while the off hand is adjacent the fence in position for adjusting the position of the workpiece.

An apparatus in accordance with the present invention positively prevents the operator of a sawing apparatus from moving his off hand fingers or other parts of his off hand into the cutting area of the blade since the operators hands must both be occupied to actuate and operate the sawing apparatus, one guiding the saw while the other activates the second switch (or one or the other of said pair of switches). This is necessary since both the first switch and the second switch (or one of said pair of switches) must be simultaneously engaged or the blade will cease to rotate. The pair of switches are located adjacent the fence so the operators off hand can adjust the position of the workpiece while activating the switch. The device is very preferably operated in connection with an automatic brake which positively and swiftly brakes the saw blade on interruption of the power to the motor which motivates the saw blade. A conventional blade guard can also be utilized in combination with the improvement of the present invention. Furthermore, for such machinery as a radial arm saw, where the saw blade can be arranged along the length of the workpiece support structure and the workpiece can be ripped, an override switch can be provided which is engaged only by rotation of the saw blade into the riping position.

BRIEF DESCRIPTION OF DRAWINGS

The invention will be better understood by reference to the figures of the drawings wherein like numbers denote like parts throughout and wherein.

BEST MODE FOR CARRYING OUT THE INVENTION

Figure 1:
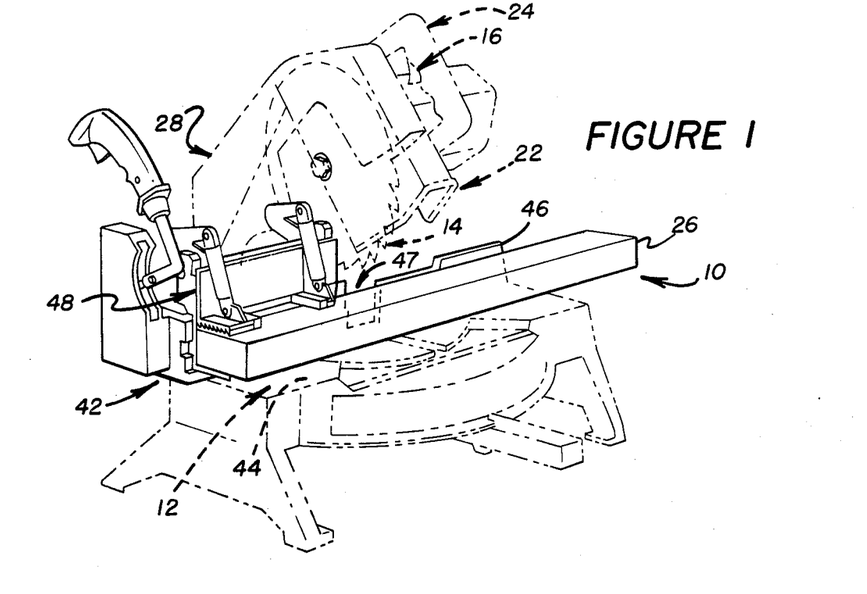
FIG. 1 illustrates, in front left perspective, an improved sawing apparatus in accordance with an embodiment of the present invention as mounted to a conventional powered miter saw (in phantom)
Figure 2:
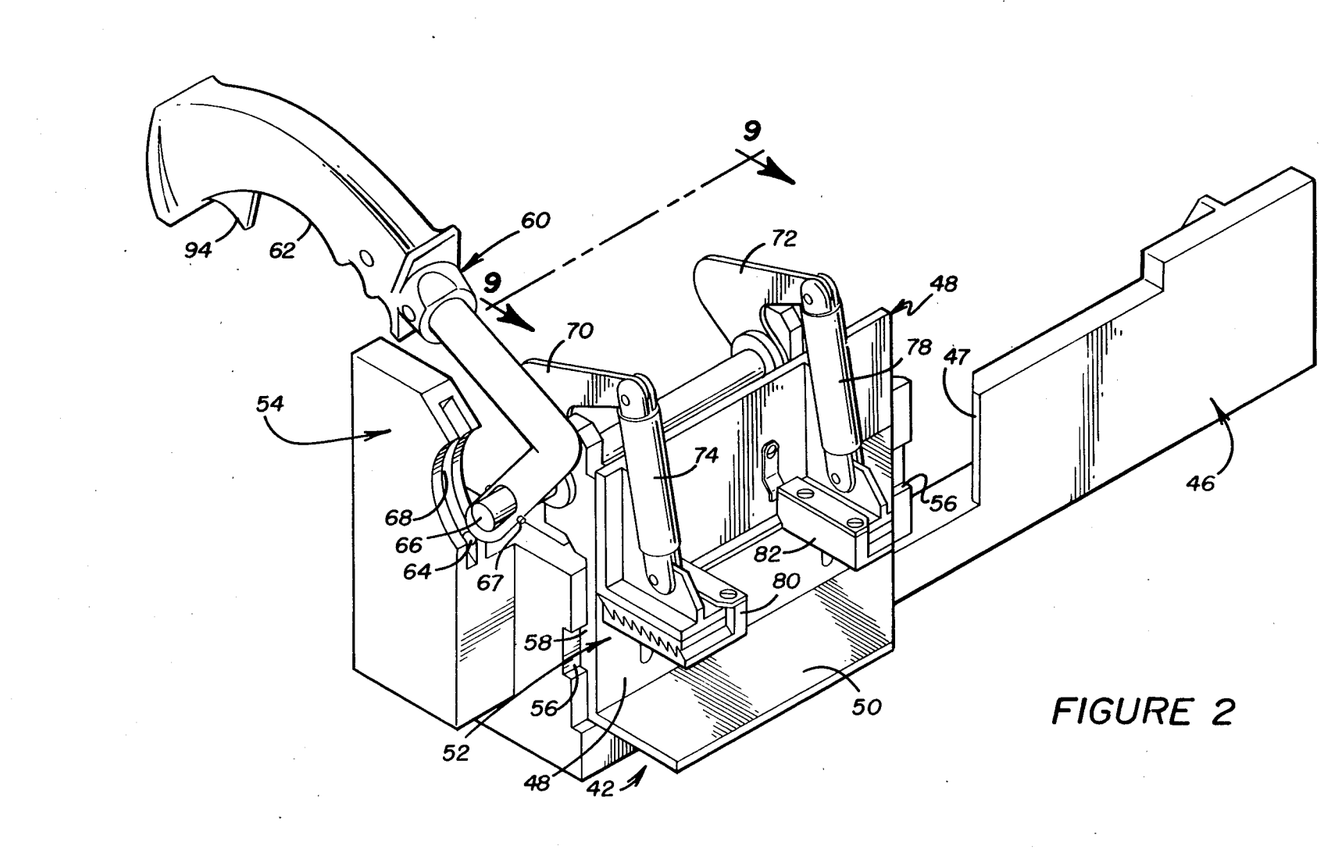
FIG. 2 illustrates, in a similar view to FIG. 1 but on a much larger scale and in more detail, the embodiment of the present invention shown in FIG. 1.

An improved sawing apparatus 10 in accordance with an embodiment of the present invention includes (FIGS. 1, 2 and 3) a workpiece support structure 12 and an operator moveable electrically powered saw blade 14 having a first normally biased off switch 16 which controls application of electrical power from an electrical power source 18 to a motor 20 which rotates the saw blade 14. The switch 16 is positioned to be controlled by the hand of an operator which controls movement of the saw 14. A conventional transparent plastic saw guard 22 may be provided to deter objects or body parts from being placed in the cutting area of the blade 14. Movement of the blade 14 is controlled by the operator grasping a hand grip 24 and pulling downwardly to move the blade 14 downwardly through the position of a workpiece 26. In miter saw arrangements the angle of the blade 14 relative to the workpiece 26 can be adjusted since the support 28 for the saw 14 will generally be slidably and pivotally mounted to the support structure 12. Note that the operator must be depressing the switch 16 or the blade will not be powered by the motor 20.

It is preferred that conventional means 30 (FIG. 3) be provided for automatically braking the blade 14 when the powering circuit for the motor 20 is broken. This can be accomplished, for example, by use of a solenoid 32 which normally serves to overcome the force of a spring 34 sufficiently to prevent a brake 36 from contacting the motor 20. When power is interrupted in the circuit to the motor 20, the solenoid 32 is no longer activated whereby the spring 34 pulls downwardly upon the illustrated lever 38 which, acting via the fulcrum 40 leads to application of the brake 36 to the motor 20.

In accordance with the embodiment of FIGS. 1-9 of the present invention, a device 42 (FIG. 1) is provided which is adapted for gripping, positioning and clamping workpiece 26 relative to the workpiece support structure 12. The device 42 is best seen in overall view in FIG. 2 and is useful with the support structure 12, seen in FIG. 1. Generally, the device 42 fits on top of a table 44, or forms part thereof, which forms a part of the support structure 12. A fence 46 is generally attached to the table 44 and serves for guiding the workpiece 26. The fence 46 generally has an opening 47 whereat the saw 14 can be moved to cut the workpiece 26. A frame 48 forms a part of the device 42 and is located adjacent the fence 46. The frame 48 has a base 50 which is parallel generally to the table 44 or a part thereof and which extends away from the fence 46. A clamping construction 52 is provided which is adapted to press downwardly upon the workpiece 26 and to grip the workpiece 26 between itself and the base 50. Frame positioning means 54 are provided for positioning the frame 48 laterally across the table 44 generally parallel to the fence 46 when the workpiece 26 is gripped by the device 42. In the embodiment illustrated the frame positioning means 54 includes a slide structure 56 along the fence 46 and parallel to the table 44. A slide mating structure 58 extends along the frame 48 parallel to the table 44, the slide mating structure 58 mating with the slide structure 56 in sliding fit therein. This allows reciprocal movement of the frame 48 along the fence 46 and parallel to the table 44. A lever 60 having a hand grip portion 62 is pivotally mounted relative to the fence 46 and table 44 at a pivot 64. The lever 60 is mounted (see FIG. 8) whereby, so long as the lever 60 is not moved sufficiently to immovably clamp the workpiece 26 in a single position, if it is moved sideways relative to the fence 46 it impels the frame 48 sideways via its pivotal attachment to a bar 66 at a pin 67. Thus, the lever 60 is adapted to exert a force upon the frame 48, which force is generally parallel to the slide structure 56.

The lever 60 is also further adapted to move the clamping construction 52 downwardly upon the workpiece 26 to grip and eventually clamp the workpiece 26 in a single position. Adverting to FIGS. 4 and 5, the lever 60 can be pivoted downwardly rotating the bar 66. In such a situation, the pivot 64 moves along a circular track 68. A pair of cranks 70, 72 (FIG. 2) are rigidly mounted to the rod 66 and are moved clockwise in FIGS. 4 and 5 whereby they exert downward forces via links 74 and 78 (see FIG. 2) thereby pushing downwardly upon clamps 80 and 82.

The bottoms of the clamps 80 and 82 grip the workpiece 26 by friction and are selected to have a higher coefficient of friction than does the base 50. Accordingly, so long as the clamps 80 and 82 do not bear down upon the workpiece 26 sufficiently so as to immobilize it, lateral movement of the lever 60 leads to lateral movement of the workpiece 26.

Figure 6:
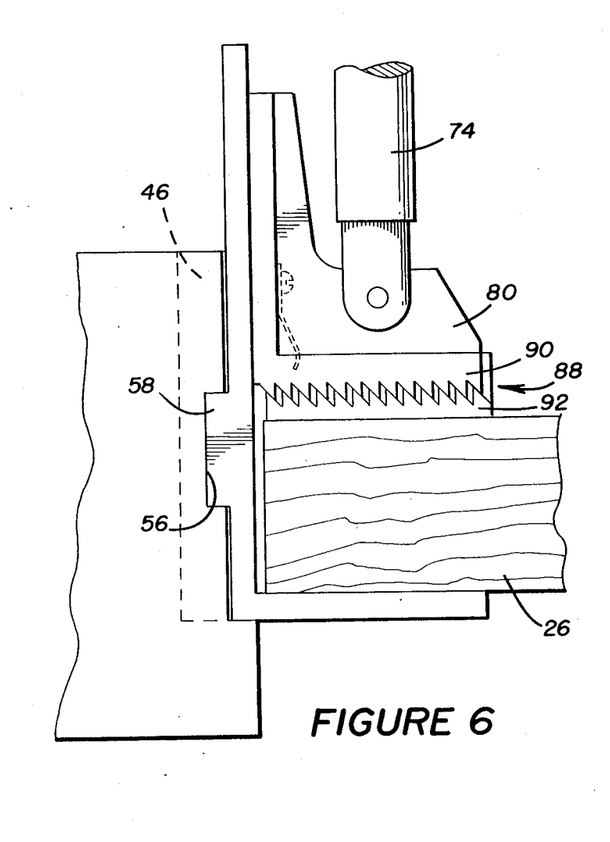
FIGS. 6 and 7 are partial views in enlarged scale showing successive grasping of a workpiece by the embodiment of FIG. 1.
Figure 7:
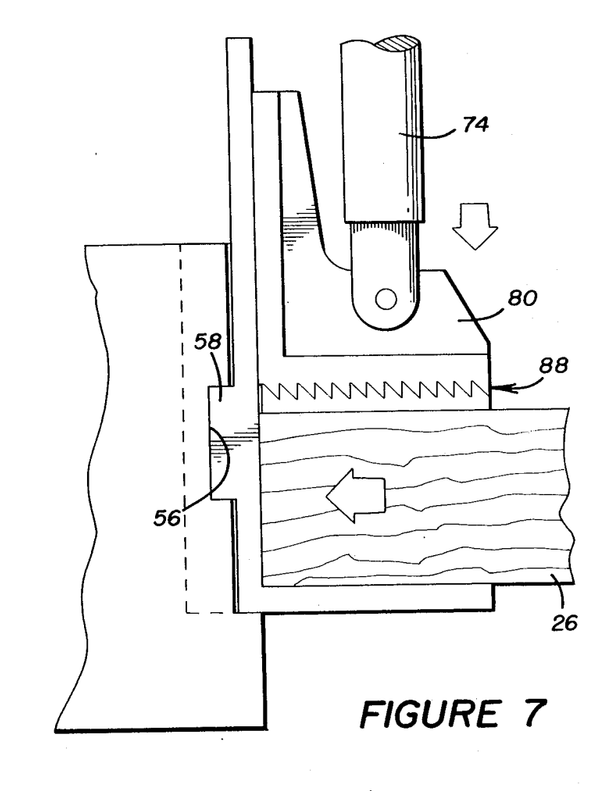
Figures 8, 9:
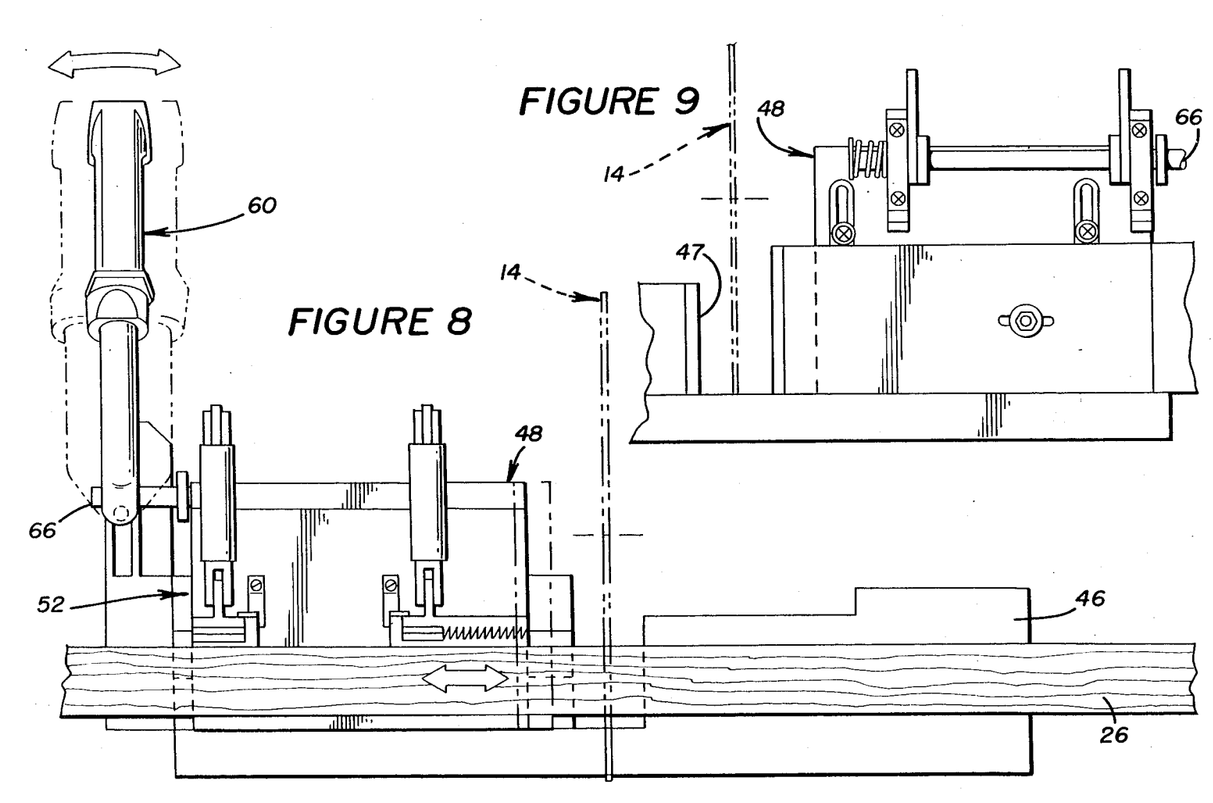
FIG. 8 illustrates a workpiece grasped by the embodiment of FIG. 1 and being moved along the workpiece support and relative to the position of a saw blade.
FIG. 9 illustrates, in rear partial view, a detail in the structure of the embodiment of FIG. 1.

FIGS. 6 and 7 illustrate another feature of the preferred clamping construction 52. In particular, the preferred clamping construction 52 includes means 88 for urging the workpiece 26 laterally towards the fence 46. The particular means 88 illustrated is in the nature of a pair of interlocking sawtooth members 90 and 92, both a part of the clamps 80 and 82 which, when the clamps 80 and 82 are clamped downwardly upon the workpiece 26 lead the lowermost 92 of the members 90 and 92 to be forced leftwardly in FIGS. 6 and 7 towards the fence 46. By friction the workpiece 26 is similarly moved. At the same time, the workpiece is immobilized to prevent lateral and other movement thereof.

Figure 3:
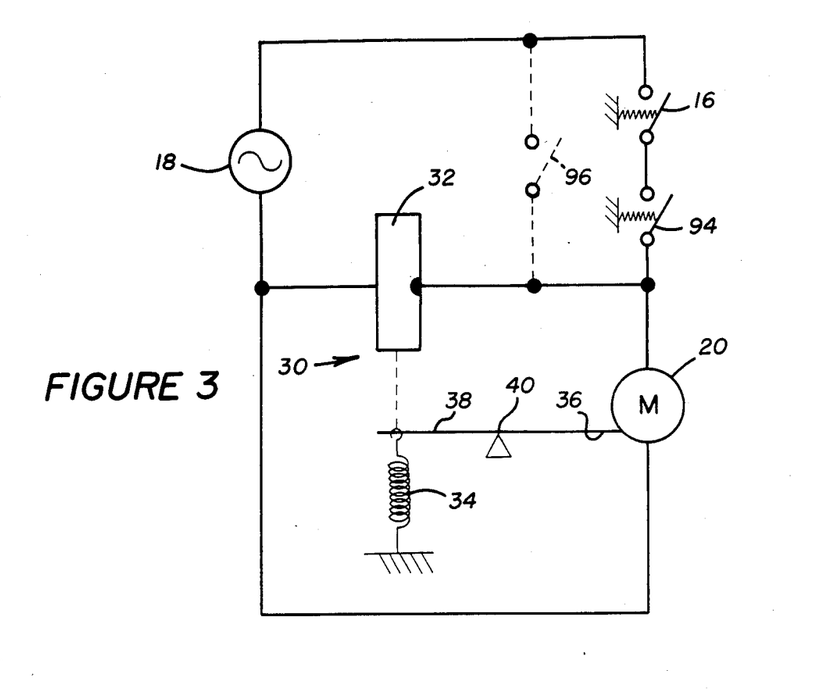
FIG. 3 illustrates, schematically, the electric power circuit for operation of the embodiment of FIG. 1, and in phantom, an optional feature useful with radial arm saws.
Figure 4:
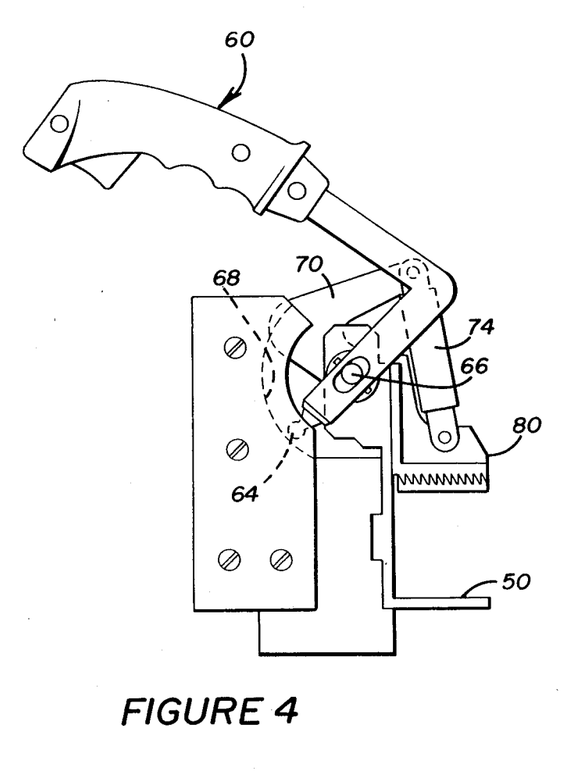
FIG. 4 illustrates, in side view, the embodiment of FIG. 1 positioned ready to clamp a workpiece.
Figure 5:
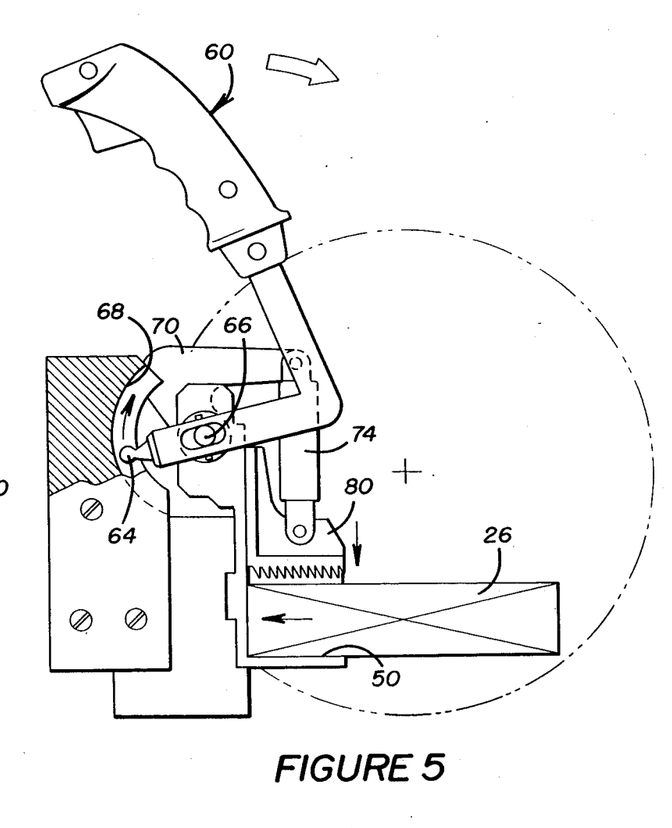
FIG. 5 illustrates, in a view similar to FIG. 4, how a workpiece is grasped by the embodiment of FIG. 1.

In accordance with the present invention it is required that a switch 94 (FIG. 2) which is normally biased off, be connected in series with the first normally biased off switch 16, all as shown in FIG. 3. The second switch 94 must be positioned to be controlled by the off hand of the operator, which off hand is utilizing the device 42. In the particular embodiment illustrated the switch 94 is shown as being mounted to the lever 60 at the hand gripping portion 62 thereof. Thus, a user must be making use of the lever 62 and depressing the switch 94 at the same time he is gripping the saw grip 24 and depressing switch 16, or the saw will not rotate.

Figure 12:
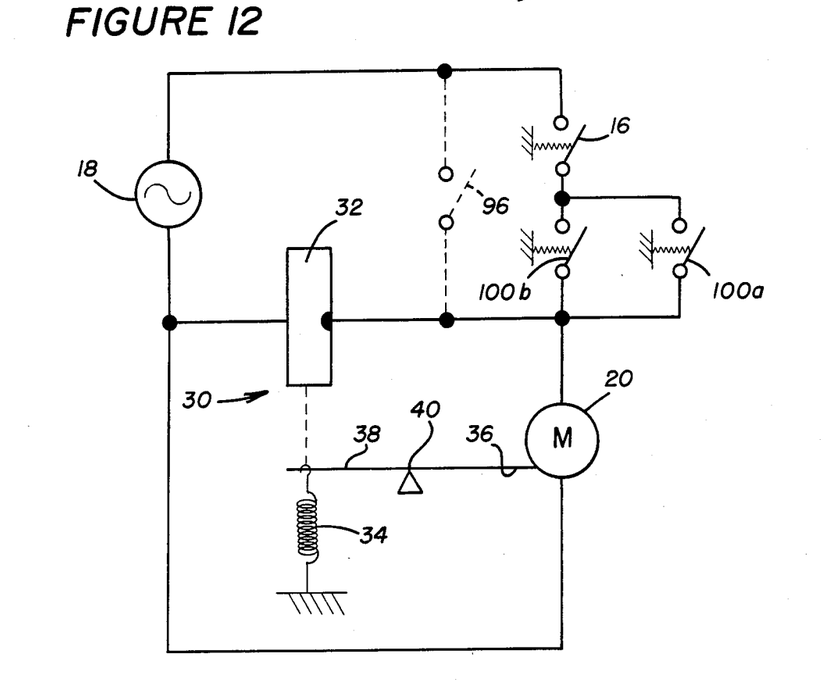
FIG. 12 illustrates, schematically, the electric power circuit for operation of the embodiment of FIGS. 10 and 11, and in phantom, an optional feature useful with radial arm saws.

FIGS. 3 and 12 also illustrate an embodiment of the invention, in phantom, wherein a third normally biased off switch 96 is connected in parallel across the first and second switches 16 and 94. This embodiment of the present invention is useful wherein the saw 14 is in the nature of a radial arm saw which is used for ripping workpieces 26. In such an instance, the third normally biased off switch 96 may be placed in the on position selectively by positioning the radial arm saw in position for ripping the workpiece 26.

Note that in the embodiments illustrated the fence 46 is of substantially one piece construction. A fence 46 such is as used in and with the apparatus 10 of the present invention can replace a conventional fence normally supplied with a radial arm saw or miter saw or the like. Alternatively, a device in accordance with the present invention can be mounted to an existing fence, or part of an existing fence can be removed and a replacement partial fence adapted to cooperate with the improved apparatus of the present invention can be installed in its place.

Figure 10:
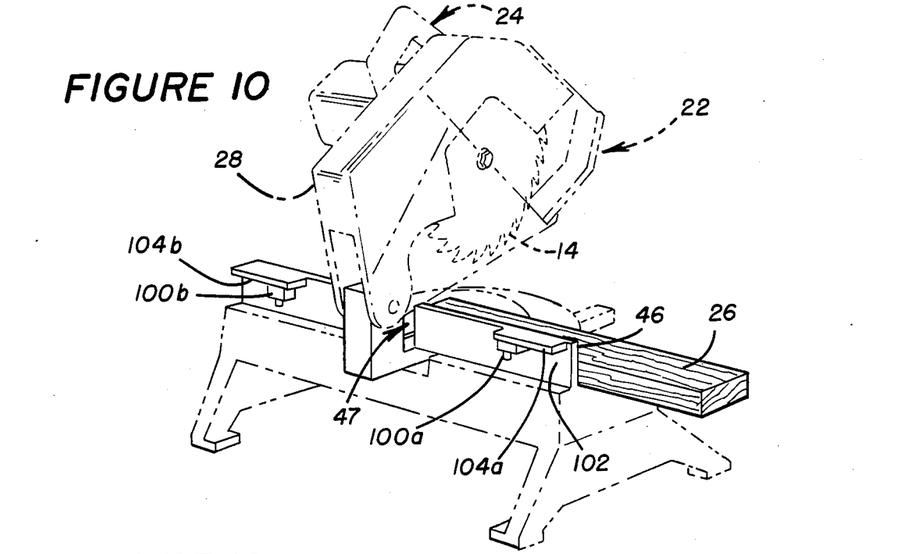
FIG. 10 illustrates, in rear left perspective, an improved sawing apparatus in accordance with an embodiment of the present invention as mounted to a conventional miter saw (in phantom)
Figure 11:
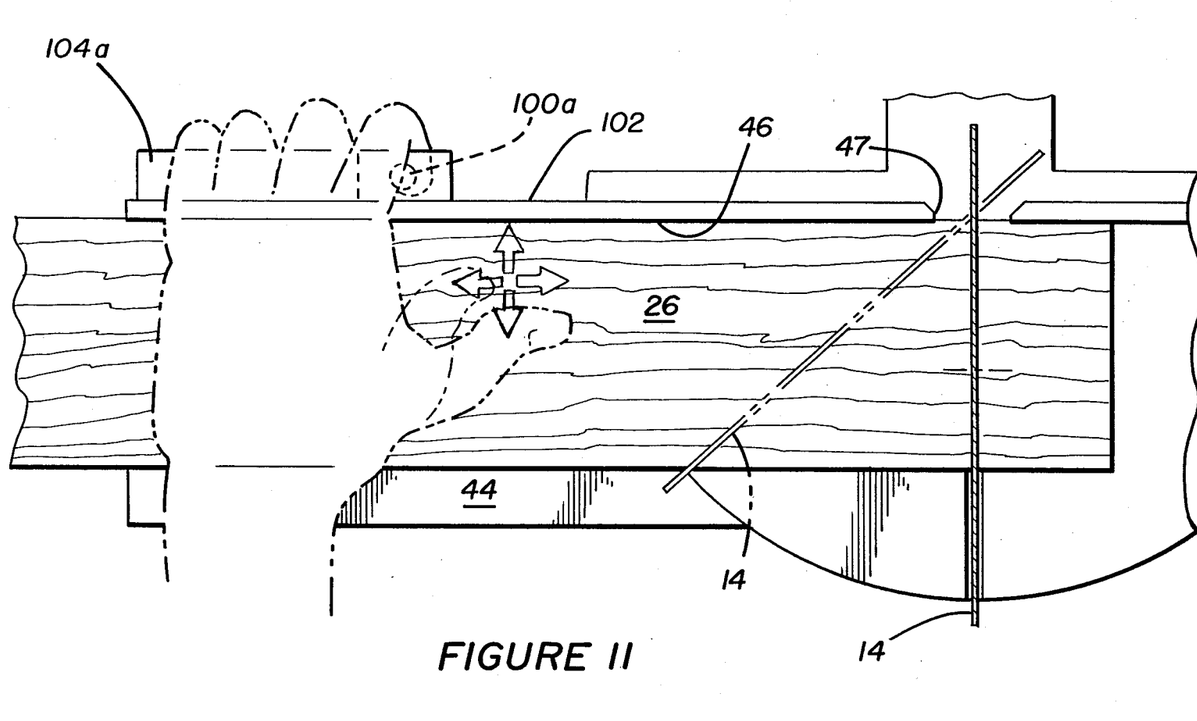
FIG. 11 illustrates, in partial top view, the embodiment as in FIG. 10 along with an operators off hand (in phantom)

In accordance with the embodiment of FIGS. 10-12 the gripping, positioning and clamping device 42 of the embodiments of FIGS. 1-9 can be eliminated with no loss in safety and with considerable reduction in cost. In the embodiment of FIGS. 10-12 a pair of switches 100a and 100b are mounted adjacent to the fence 46. In practice they are preferentially mounted to the fence 46 on its backside 102. Generally, the switches 100a, 100b are mounted to appropriate supports 104a, 104b. The switches 100a, 100b are mounted sufficiently far from the saw blade 10 so that the off hand of the operator, if it is activating one of the switches 100a, 100b, is prevented from contacting the saw blade 14 even when the saw blade 14 is rotated to be as close to the off hand as is possible. The switches 100a, 100b are also mounted whereby if the off hand of the operator is activating (closing) either switch, the off hand can also adjust the position of the workpiece 26. In the embodiments of FIGS. 10-12 this generally occurs through use of the thumb of the off hand. Indeed, this type of construction is useful when only the single switch 100a is mounted adjacent the fence 46.

FIG. 12 illustrates the power circuitry of the embodiment of FIGS. 10-12. The circuitry of FIG. 12 is identical to that of FIG. 3 with the exception of the addition of normally biased off switch 100a in parallel to switch 100b and in series with switch 16. The use of a pair of switches 100a, 100b in parallel allows either the right or left hand of the operator to serve as the off hand.

INDUSTRIAL APPLICABILITY

The improved sawing apparatus 10 in accordance with the present invention is useful with miter saws or rotary arm saws. Its purpose is to prevent an inattentive operator of such an apparatus, or one who is attentive and is bumped or slips while operating the apparatus, from placing his fingers or other portions of his anatomy in jeopardy during operation of the overall sawing apparatus 10.

While the invention has been described in connection with certain specific embodiments thereof, it is to be understood that such description was for convenience only and that other objects and advantages of the invention will become apparent to one skilled in the art from the foregoing description and the accompanying drawings and the invention includes such advantages and objectives and includes such modifications as may be apparent to one of skill in the art to which the invention pertains, all of which fall within the scope of the invention as defined by the appended claims.

We claim:

1. In a sawing apparatus having a table for supporting a workpiece, a fence for guiding the workpiece and an operator moveable electrically powered saw blade having a first normally biased off switch controlling application of electric power to said sawing apparatus, said switch being positioned to be controlled by a hand of an operator which controls movement of the saw blade, an improvement comprising:

a pair of normally biased off switches connected in parallel to one another and in series with said first normally biased off switch, said switches of said pair being mounted adjacent to said fence, one to the left of said saw blade and the other to the right of said saw blade, the switches of said pair being located a sufficient distance from the saw blade to prevent the saw blade from contacting the off hand of the operator when the off hand is activating either of said switches of said pair, the switches of said pair being positioned to be controlled by the off hand of the operator while the off hand is adjacent said fence in position to adjust the position of said workpiece.

2. An improved sawing apparatus as set forth in claim 1, further including:

an additional normally biased off switch connected in parallel across said first switch and said pair of switches, said additional switch being selectively positionable in its on position.

3. An improved sawing apparatus as set forth in claim 1, further including:

means for braking the saw blade in response to interruption of said electric power.

4. In a sawing apparatus having a table supporting a workpiece, a fence for guiding the workpiece and an operator moveable electrically powered saw blade having a first normally biased off switch controlling application of electric power to said sawing apparatus, said switch being positioned to be controlled by a hand of an operator which controls movement of the saw blade, an improvement comprising:

a second normally biased off switch connected in series with said first normally biased off switch, said second switch being mounted adjacent to said fence a sufficient distance from said saw blade to prevent the saw blade from contacting the off hand of the operator when the off hand is activating the second switch and in a position whereat the off hand of the operator can, simultaneously with activating the second switch, adjust the position of the workpiece along the fence.

5. An improved sawing apparatus as set forth in claim 4, further including:

an additional normally biased off switch connected in parallel across said first switch and said pair of switches, said additional switch being selectively positionable in its on position.

6. An improved sawing apparatus as set forth in claim 4, further including:

means for braking the saw blade in response to interruption of said electric power.

* * * * *